April 11, 1967    E. M. RUTZ    3,314,067
RE-DIRECTIVE ANTENNA ARRAY AND RELATED COMMUNICATIONS SYSTEM
Filed Dec. 31, 1963    5 Sheets-Sheet 1

INVENTOR.
ELISABETH M. RUTZ
BY Paul D. Carmichael
ATTORNEY.

April 11, 1967 E. M. RUTZ 3,314,067
RE-DIRECTIVE ANTENNA ARRAY AND RELATED COMMUNICATIONS SYSTEM
Filed Dec. 31, 1963 5 Sheets-Sheet 5

United States Patent Office 3,314,067
Patented Apr. 11, 1967

3,314,067
RE-DIRECTIVE ANTENNA ARRAY AND RELATED COMMUNICATIONS SYSTEM
Elisabeth M. Rutz, Bethesda, Md., assignor to International Business Machines Corporation, New York, N.Y., a corporation of New York
Filed Dec. 31, 1963, Ser. No. 334,744
26 Claims. (Cl. 343—100)

This invention relates to an antenna array for use in a communications system and, more generally, to means for directing electromagnetic radiation in a communications system. In particular, this invention relates to communications systems using converter circuits in an array to create a directive antenna which receives electromagnetic radiation from one point and collimates and redirects that electromagnetic radiation after frequency translating; modulating; and, in the most useful embodiment, amplifying. This invention concerns the antenna array with the converter circuits and the systems to utilize the array. The invention has particular utility in a satellite communication system having unstabilized satellites.

Communications using a link with a space satellite in the communications path recently have become a reality. Methods are presently known to reflect electromagnetic radiation from satellites which do not amplify the radiation. Space communication systems operating with such passive satellites require large amounts of transmitted power to perform, and therefore the cost and technical difficulty inherent in such systems with passive reflectors are formidable. The active satellite, one which amplifies received signals, is also known. Known active satellites are unsatisfactory, however, for several reasons. A major disadvantage of known active satellites is that their reliability is often comparatively low. In addition, the amplification techniques used require bulky electrical components. The complicated amplification schemes of the prior art which require a plurality of filters or transmission paths are subject to increased phase and similar distortion as the number of components increases.

Active and passive satellites are known which both direct and collimate the electromagnetic radiation to thereby increase the power directed to a receiver. Many known collimating satellites, however, require a stable attitude in space. Such a requirement, of course, substantially increases the bulk of the satellite and the technical problems of launching and positioning. Furthermore, passive satellites are not readily capable of translating the frequency of the received signal. A ground station interrogating a satellite which redirects the same frequency transmitted from the ground station, must discriminate between the transmitted signal and the received signal by time division of other cumbersome methods. It is clearly desirable to provide a satellite which translates the frequency of an interrogation signal to a different frequency so that a ground station near the transmitting location can discriminate the received signal with a minimum of technical complexity.

The prior art has no communications system which is easily selective so that a transmitting station can select one or one of several differently located stations and initiate communications with the selected station. Such a system is clearly a desirable one.

It is a principal object of this invention to provide an improved structure for directing electromagnetic radiation in a communications system.

It is a major object of this invention to provide an antenna array system with substantial electronic and antenna gain which is light in weight and functions with low distortion.

It is another major object of this invention to provide an improved antenna array system which can function with good reliability in an isolated environment.

It is a further object of this invention to provide an antenna array system with electronic gain which does not use presently known, relatively bulky and complex electrical systems.

It is a still further object of this invention to provide an antenna array system with electronic gain which uses no non-reciprocal device in the antenna except simple, directional couplers.

It is a still further objective of this invention that the redirection of the received interrogation signal is accomplished in a frequency conversion process where the phase of the received signal becomes inverted.

It is another object of this invention to provide a directive antenna array which translates a received interrogation signal to a redirected signal which is different in frequency from the interrogation signal and does not require filters to separate the interrogation signal from the translated signal.

It is still another object of this invention to provide an improved collimating redirective antenna array system which operates over $4\pi$ steradians (the entire spherical surface) and therefore does not require a stable attitude with reference to a transmitted interrogation signal.

It is another further object of this invention to provide a lightweight, low distortion antenna array system which can receive power from an interrogating ground station and which can redirect a frequency or phase modulated signal to the interrogating ground station.

It is another important object of this invention to provide a lightweight low distortion antenna array system which can receive power from an interrogating ground station and which can redirect a modulated signal which is of a frequency different from the received interrogation signal.

It is still another important object of this invention to provide an antenna system which can receive an interrogation signal from one interrogating ground station and which can redirect a signal in response to the interrogating signal to a second ground station.

It is a further, more general object of this invention to provide an active communication system by which one station can interrogate a space satellite to communicate with a selected one of a group of receiving stations which are located at different points, usually on the ground.

It is a feature of the invention that it is particularly well suited to the generation of frequency or phase modulated signals. Frequency or phase modulated signals are much more impervious to noise than most other forms of modulation, particularly amplitude modulation.

A further feature of the invention is that the modulation band width of the redirected, frequency modulated signal is twice that of the modulation band width of a local oscillator signal used with signal converters. A wide band frequency modulated signal has improved resistance to noise relative to the noise resistance of a narrow band frequency modulated signal. Generally, a wide band signal is difficult to produce, but the invention has the inherent capability, without special added structure, of doubling the modulation band width of a signal in existence.

SUMMARY OF BROAD ASPECTS OF THE ANTENNA ARRAY

(1) The array generally

In accordance with the broadest aspects of the invention, a plurality of receiving antenna elements are located in any spaced configuration. Each receiving antenna element is in a circuit which includes a signal converter responsive to two signals at its input circuit to produce a third signal at its input circuit, the phase of which is the difference of the phase of the two signals when the third signal is the lower modulation sideband. A local oscillator signal is coupled to each of the signal converters of the array with the phase of the local oscillator signal substantially the same across all of the signal converters. When a transmitted interrogation signal is intercepted by the antenna elements and the local oscillator is operative, beat frequencies are produced in the signal converter and energy is transferred to these beat frequencies. Antenna elements and appropriate connections are connected to the input of each signal converter to reradiate at least one beat frequency. The reradiated sideband are reradiated at points in space which form a pattern in which the signals substantially add coherently in substantially one direction.

In accordance with the more specific implementation of the invention, the signal converters are each comprised of one non-linear element. New frequencies are produced inherently in the beat of two signals across a non-linear element. In the antenna, array the non-linear element is operated as a converter, where one signal is the incoming signal and the other is a local oscillator signal. The phase of a beat frequency produced in each non-linear element is a linear function of the phase of the incoming frequency relative to the locally generated frequency. Since the local signal is the same phase at each non-linear element, some of the beat frequencies have a phase sequence with reference to one another which is different from the phase sequence of the received radiation at each of the array elements of the receiving antennas, but which phase sequence is in a regular pattern in space as viewed from the transmitted signal. Beat frequencies of such changed phase sequence are reradiated in a pattern similar to the pattern of the receiving antennas. Due to the regular phase sequence and the regularity of the pattern of reradiation, the reradiated sidebands add coherently, but because of the phase sequence, specifically the inverted phase sequence of the lower modulation sidebands, collimation is in a direction different from the direction which would have occurred had the antenna array been a simple reflector. Collimation in the desired direction occurs regardless of the attitude in space of the antenna array.

In accordance with a still more specific implementation of the invention, a source of locally generated oscillations is directionally coupled into the converter circuit connected to each antenna element by transmission lines of equal length. The beat frequency is reradiated in the spaced configuration desired with a minimum of structure through the existing transmission line to the receiving antenna element associated with the non-linear element creating the beat frequency, which transmission line is connected to the input of the converter circuit. No further increase in structure is required to thus use the receiving antenna element to reradiate. Lower sidebands collimate toward the incoming signal.

In accordance with an important feature of the specific embodiment, each non-linear element is a tunnel diode operated as a frequency converter and amplifier. Amplification is obtained because the tunnel diode can be operated as an active device. Frequency conversion is obtained because of the inherent non-linear characteristics of the tunnel diode, and also because a tunnel diode can be operated at a point on its characteristic curve which increases the non-linearity of the output.

In accordance with another important feature of the specific embodiment, the transmission path from each antenna element is terminated by a non-linear element and also by a reactive circuit element of such magnitude as to block low frequency signals from passing efficiently back to the antenna element. Low frequencies produced by the non-linear element in the frequency conversion process proceed to a second network which is designed to reflect those low frequencies back to the non-linear element as signals of substantial voltage. Thus, where $f_{LO}$ is the local oscillator signal and $f_s$ is the incoming interrogation signal, an image frequency $2f_{LO}-f_s$ is created in two steps. First, $f_{LO}$ and $f_s$ beat across the non-linear element to produce a signal which, depending upon which signal is the higher frequency, could be $f_{LO}-f_s$. The signals $f_{LO}$ and $f_s$ are selected to be near one another in frequency. Thus, the difference is a low frequency, and is blocked by the reactive element from going back to the antenna. Preferably, the low frequency signal produced is reflected immediately back across the non-linear element where it beats with $f_{LO}$. A sum signal appears which is $2f_{LO}-f_s$. This is a high frequency signal very near in frequency to the received signal. Due to its high frequency, it passes the reactive element and proceeds to the associated antenna element where it is reradiated. Since the image frequency is the lower modulation sideband, its phase is inverted in reference to the phase of the interrogating signal. With this arrangement, the reradiation frequency desired is created with a minimum of power dissipation and distortion in the transmission paths of the antenna array and with the proper phase for redirection. Furthermore, the modulation bandwidth of $f_{LO}$, when $f_{LO}$ is a frequency modulated signal, is doubled, thus creating a wider modulation spectrum.

(2) Best configuration of the array

In accordance with one specific embodiment of the invention, an antenna array is provided in which the antenna elements are physically located in a spherical or curved configuration. A reradiated pattern identical to the pattern of a received signal but inverted in phase sequence with reference to that of the received signal would result in a signal redirected perfectly to the location of the transmitted signal when the reradiated signal is of the same frequency as the received signal. A reradiated signal of different frequency may be scattered somewhat or may be directed elsewhere, depending upon the geometry of the antenna array. Frequency translation is desirable, however, and is accomplished in this invention. A convex curved array configuration, preferably spherical, is utilized when the system's specifications are such that the frequency translated signal is to be coherently reradiated directly back to the source of the interrogation signal. The redirection toward the source of the interrogating signal results from the inherent symmetry of a sphere where the array elements of the illuminated are are displaced increasingly away from the center of the incoming signal symmetrically on each side of the center. Slight scattering of the redirected signal is in opposite directions on each side of the center and the major component is therefore directly back toward the source of the interrogation signal. With some other configurations the slight scattering effect will add in one direction and the major component of the reradiated signal will therefore not be in the direction of the source of the interrogating signal.

Summary of broad aspects of the communications system

In accordance with a second broad aspect of the invention, a communications system is provided which utilizes an unsymmetrical array of antenna elements. An unsymmetrical array is one in which the received signal does not intercept antenna elements at substantially the same time on opposite sides of the center of reception. The spherical array is substantially symmetrical in that the elements are displaced from the received signal approximately the same amount on opposite sides of the center of where an interrogation signal intercepts the spherical array. The reradiated signal from an unsymmetrical array is directed at an angle with reference to the received signal, which angle is established by the geometry of the array and by the difference in wave length of the reradiated signal from that of the received signal. A receiving station may be located where the redirected signal appears. In this manner, a communications system is created in which a station directing an electromagnetic signal to a satellite can bring signals from the satellite into communication with a receiving station located at a point displaced on the ground from the interrogating station. A plurality of receiving stations situated at different locations can be selectively brought into contact by changing the frequency of the ground transmitted electromagnetic radiation or the frequency of the locally generated oscillations at the satellite to thereby vary the difference in wave length of the interrogation and reradiated signal.

In accordance with the more specific implementation of the communications system, the antenna array system is comprised of antenna elements located in a substantially linear configuration which, in effect, is a highly unsymmetrical array. The linear array reradiates a signal in phase sequence linearly related to the incoming signal at each antenna, but different from the phase sequence of the incoming signal. The linear configuration and the change in phase sequence created by signal translation in the antenna combine to produce a strong reradiated signal back in a new direction.

The foregoing and other objects, features, and advantages of the invention will be apparent from the following more particular description of the preferred embodiment of the invention, as illustrated in the accompanying drawings.

THE ARRAY IN A COMMUNICATING SYSTEM

Figure 1:
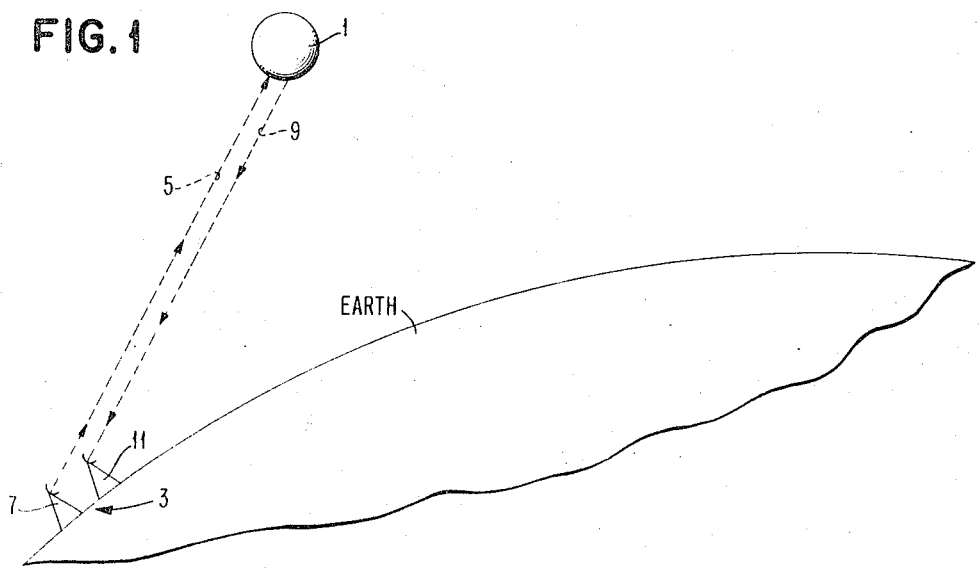
FIG. 1 is a system diagram showing how the spherical array of the preferred embodiment receives and redirects signals.

Reference is made to FIG. 1, which shows one system with which this invention is concerned. FIG. 1 shows a satllite 1 situated above the earth. A ground station 3 sends interrogation signals 5 to the satellite by transmitter 7 and receives intelligence signals 9 on receiver 11. The satellite 1 may contain information bearing signals obtained by any one of many systems known or possible. In the preferred embodiment of this invention it is assumed that the satellite contains a television camera, and that the camera has made certain observations and transformed those observations into a frequency modulated electrical signal.

Satellite communications of the basic type shown in FIG. 1 are known, but in those systems the transmitted interrogation signal 5 provides the power of the received signal 9, or the active array of the prior art is prone to distortion, bulky and complex, or unreliable. In the passive antenna array of the prior art, the array situated in the satellite 1 functions to merely redirect the transmitted interrogation signal 5 after modulating the signal. The antenna array and its associated elements provided by the invention of this application supply power to the transmitted signals with a minimum of structure and complexity. In doing so, the entire characteristics of the reradiated wave at the array are efficiently controlled, and the reradiated wave is collimated and redirected in the direction of the incoming wave. These functions are performed by solid state frequency converter circuits when placed correctly in the array.

THE SPHERICAL ARRAY

Figure 2:
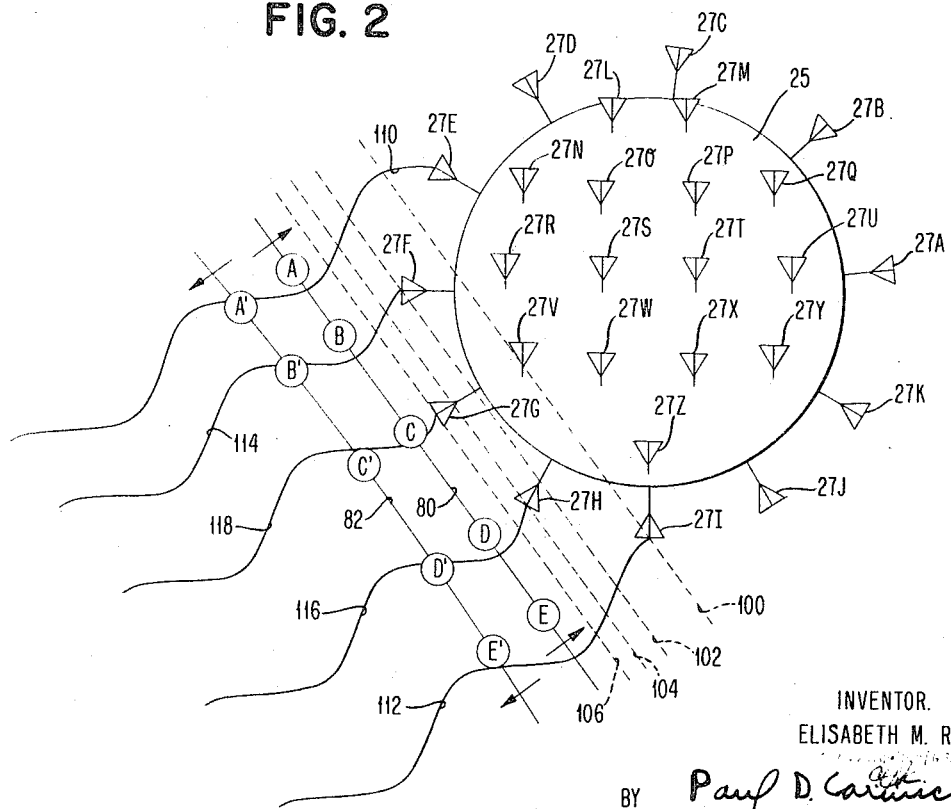
FIG. 2 is a drawing which makes clear the actual external structure of the spherical array and the manner in which signals are intercepted and collimated.

These advantages are accomplished by the satellite mounted antenna array shown in FIG. 2 and the electrical elements associated with each antenna, which electrical elements will be described below. FIG. 2 shows the external structure of one preferred array of this invention. The satellite 1 has a spherical superstructure 25. A plurality of antennas including antennas 27A through 27Z, shown in FIG. 2, are supported by the spherical superstructure 25 and are spaced to occupy areas of equal size which together include substantially all of the spherical area. Each antenna has circuitry associated with it which both amplifies and converts in frequency and phase to direct the outgoing signals back in the direction of the received interrogation signals.

STRUCTURE OF THE ANTENNA ELEMENT SYSTEM

Figure 3:
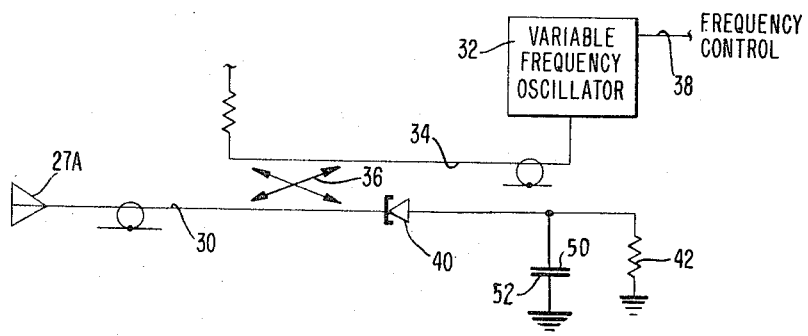
FIG. 3 is a schematic drawing to show the major operative features of a single antenna element in the array and its associated circuitry.

Reference is made to FIG. 3 which shows a simplified diagram of one antenna element and its associated circuitry. The antenna 27A is chosen for purposes of illustration in FIG. 3. It will be understood, however, that every antenna element mounted on the satellite 1 has circuitry associated with it in the manner shown and described in connection with FIG. 3.

The antenna element 27A in FIG. 3 is connected to a coaxial transmission line 30. A locally generated signal is created by variable frequency oscillator 32, located in the satellite, and is directed through a coaxial transmission line 34, then through a directional coupler 36, into the transmission line 30 connected to the antenna. A frequency control 38, which is connected to the variable frequency oscillator 32, establishes and varies the frequency of the local oscillations. The antenna transmission line 30 has a tunnel diode 40 at its electrical end, although low frequencies are blocked as will be described below and find a path only to terminating resistor 42.

Figure 4:
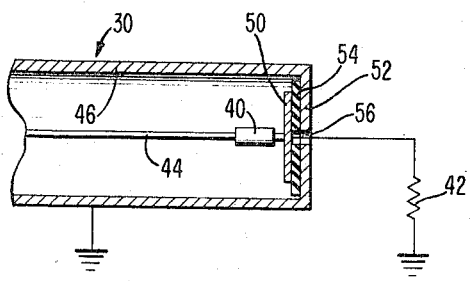
FIG. 4 is a structural illustration which shows exactly how the transmission line connected to each antenna is terminated.

Reference is made to FIG. 4, which shows the actual structure of the terminal portions of the transmission line 30 connected to the antenna. The terminal portions make up a signal converter circuit. The tunnel diode 40 is seen to be located at the end of the line 30 in series with the center conductor 44. A conductive plate 50 is located immediately past the tunnel diode 40 and is separated from a second conductive plate 52 by an insulator 54. The two plates, 50 and 52, separated by the insulator 54, form a capacitance which represents a very small reactance to the frequencies of the order of magnitude of those received by the antenna 27A and locally generated by the variable frequency oscillator 32. The tunnel diode 40 is located physically close to the plate 50 and is conductively connected thereto. To those frequencies which pass the capacitive reactance of the plates 50 and 52, the tunnel diode is so physically close as to be electrically across the end of the two transmission paths formed by the outer conductor 46 and inner conductor 44 of the transmission line 30. The resistor 42 is connected to the plate 50 but passes through a center hole 56 in the plate 52 and is thus insulated from the plate 52. Low frequencies are blocked by the capacities of the plates 50 and 52, and thus must take the path available to the resistor 42, where they are reflected back by the high resistance of resistor 42.

Figure 5:
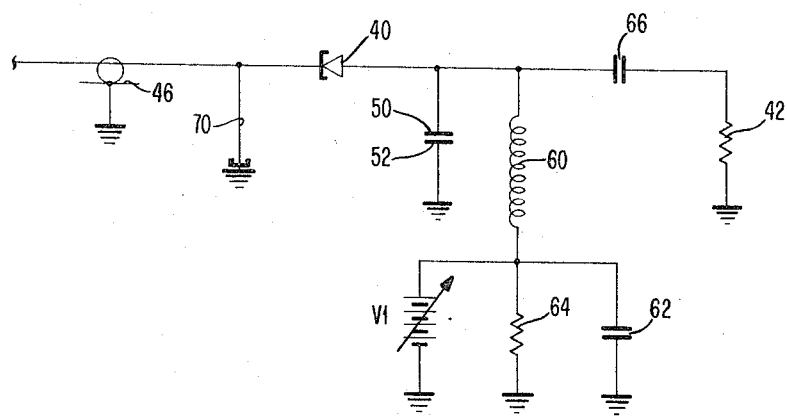
FIG. 5 is a schematic drawing to explain the electrical characteristics of the converter circuit connected to each antenna.

For a complete understanding of the structure involved, an electrical equivalent of FIG. 4 is shown in FIG. 5, which also includes the means to bias the tunnel diode at the desired operating point, and other incidental circuit elements. The tunnel diode 40 appears in FIG. 5 and also the terminating resistor 42. Ground is arbitrarily designated as the outer conductor 46 of the coaxial line 30. The capacitor with one plate labelled 50 and the second plate labelled 52 is so designated to clearly show that it is the capacity created by the plates 50 and 52 of FIG. 4. FIG. 5 shows an inductor 60 connected in parallel with the resistor 42. The inductor 60 is to block alternating current signals so that they do not pass through the biasing circuits. A voltage source V1 biases the diode 40. A capacitor 62 and a resistor 64 bypass the biasing source V1 to isolate it from undesired signals. The resistor 42 is the terminating resistor shown in FIGS. 3 and 4. The capacitor 66 isolates the resistor 42 from direct currents. A tuning inductance 70 is shown in shunt with the tunnel diode 40. This tuning inductance 70 is adjusted to cancel the inherent capacity of the diode 40 and thus prevent shunting at the diode 40 by the inherent capacity of the diode 40. The voltage source V1 is the biasing source for the diode 40 and is of such magnitude as to bias the diode 40 at the point desired. The voltage source V1 finds a path to the ground through the tuning inductance 70.

OPERATION OF THE ANTENNA ARRAY ELEMENT SYSTEM

The above detailed explanations of the structures and characteristics of the antenna element circuit should make the functioning of the circuit more easily understandable. Reference is made once again to FIG. 3. An incoming signal is received at antenna 27A and propagates down transmission line 30. A locally generated signal is created in variable frequency oscillator 32 and is coupled into the transmission line 30 by directional coupler 36. At the end of the transmission line 30, high frequency signals pass the capacity of the plates 50 and 52 and go back to the antenna element 27A. These high frequency signals are reradiated by the antenna 27A. The diode 40 and its associated circuitry creates the reradiated signals and amplifies them.

Figure 6:
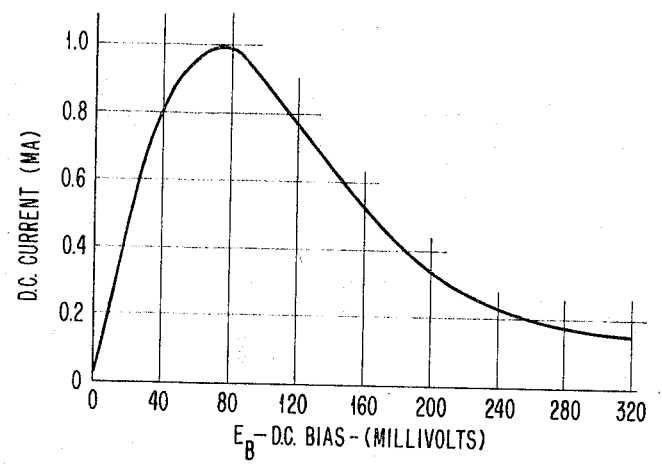
FIG. 6 illustrates the direct current characteristics of the tunnel diode utilized in the invention.

To fully explain the function of the diode 40, reference is made to FIG. 6 in which the characteristic curve of the tunnel diode is illustrated. Two features of the curve are of particular importance: First, the curve has a negative resistance, and second, a non-linear response is obtained when the tunnel diode is operated in a region which passes from the positive region of the curve to the negative region of the curve, and the curve is also non-linear to some extent at every region on the curve. A non-linear response is essential since, as is well known, two frequencies mix or beat to create other frequencies when they are processed in some way by a non-linear element. In the preferred embodiment of this invention, the diode is operated near the knee of the characteristic curve. A high degree of non-linearity is thus obtained, since signals increasing in one direction are greatly amplified by the negative region while those signals after passing through zero and increasing in the opposite direction are in the positive sloped portion of the characteristic curve and are reduced in magnitude rather than amplified. Large non-linearity is also obtained if the diode is biased far from its negative region and the signals swing in great enough magnitude to enter the negative region during part of a cycle. Such biasing is not the preferred type for use with this invention since it would require high power from the local oscillations controlling the signal. In a satellite system, in order to reduce the bulk of the system, it is of course quite desirable to minimize the power requirements of locally generated signals.

Referring once again to FIG. 3, it should be clear that the received signals and the locally generated signals beat across the tunnel diode 40 and are amplified partially by the negative characteristics of the tunnel diode 40 to create an amplified non-linear replica of the beat signals. In general, when two frequencies are mixed, or beat, in a non-linear element, the sum and difference of the frequencies appear along with every combination of the sum and difference frequencies. Thus, where $w_s$ is the incoming signal and $w_{LO}$ is a lower, locally generated signal, the output includes $w_s$, $w_{LO}$, $w_s+w_{LO}$, $w_s-w_{LO}$, $2w_{LO}-w_s$, $2w_s-w_{LO}$, $3w_{LO}-w_s$, $3w_s-w_{LO}$ ... $nw_s-mw_{LO}$. The phase of the created frequencies is, in general, different from the phase of the original frequencies. In order to fully examine the phase of the signal created, let the two signals be $$v = S \cos(w_s t + \phi) + L \cos(w_{LO} t)$$

where $v$ represents potential, S is the peak potential of the incoming signal, $w_s$ is the frequency of the incoming signal, $t$ is time, $\phi$ is phase difference between the incoming signal and the locally generated signal, L is the peak potential of the locally generated signal, and $w_{LO}$ is the frequency of the locally generated signal. The output of two signals mixed non-linearly is expressed by the formula $i = K_0 + K_1 v + K_2 v^2 + K_3 v^3 + \ldots K_n v^n$ where $i$ is a resulting current and $K_0 - K_n$ are constants. In the usual case only $K_0$, $K_1$, and $K_2$ are of significant value. In this invention the interest is in newly created frequencies. Therefore, $K_0$ and $K_1$ can be ignored here. The resulting current is $$i = K_2 [S \cos(w_s t + \phi) + L \cos(w_{LO} t)]^2$$
$$= K_2 [S^2 \cos^2(w_s t + \phi) + 2SL \cos(w_s t + \phi) \cos(w_{LO} t) + L^2 \cos^2(w_{LO} t)]$$

From basic trigonometry it is known that $$\cos \alpha \cdot \cos \beta = \tfrac{1}{2}[\cos(\alpha+\beta) + \cos(\alpha-\beta)]$$

Substituting and rearranging, $$i = K_2 \left\{ S^2 \cos^2(w_s t + \phi) L^2 \cos^2(w_{LO} t) + \frac{2SL}{2}[\cos(w_{LO} t + w_s t + \phi) + \cos(w_{LO} t - w_s t - \phi)] \right\}$$

The first two terms bear a relationship to harmonics of the two original signals. The last two terms are sidebands, that is, sum and difference frequencies.

In the invention, a lower sideband is reradiated as the coherent, information bearing signal. An important characteristic of such lower sideband is that, as shown in the above formula, the phase is controlled by the phase of the two original signals and is opposite in sense to the original signals.

The antenna 27A of FIG. 3 must, of course, be tuned to the frequency of the incoming interrogation signals. Only a sideband which is near the frequency to which the antenna 27A is tuned will be effectively reradiated by the antenna 27A. Therefore, means must be provided to create a sideband which is near in frequency to that of the incoming interrogation signals. The circuitry shown in FIG. 5 best explains how the lower sideband of the desired frequency is obtained. The locally generated signals are caused to be close in frequency to the received signals. The difference frequency is therefore quite low in frequency the first time the signals beat across the non-linear element 40. Higher frequencies are obtained which pass through the capacities of the plates 50 and 52 and proceed back out the coaxial line 30, where they are dissipated or reradiated according to their frequency and the tuning of the elements of the antenna system. Such incidental signals are not important to the invention. Furthermore, as discussed below, the undesired signals reradiated are generally reradiated in a phase and frequency pattern which scatters or directs them away from the receiver. The difference frequency, however, cannot pass the capacity 50 and 52 and therefore appears at the resistor 42. The resistor 42 is selected to be large enough to partially block the difference signals, and the electrical distance between the tunnel diode 40 and the resistor 42 is designed to be quite short. Absence of the resistor 42 results in undesired, self-sustaining oscillations at the tunnel diode 40. The size of resistor 42 is governed by this factor as well as by the requirement to reflect a substantial signal back. The locally generated signal is always of substantially greater power than the received interrogation signals. The most significant signal across the tunnel diode 40 is therefore the locally generated signal. A second beat thus occurs across the non-linear element 40. This beat is between the $w_{LO}-w_s-\emptyset$ and the signal $w_{LO}$. The sum sideband of this beat is the signal $2w_{LO}-w_s-\emptyset$. The relative phase relationship does not change because the beat is with the locally generated signal, which is the same phase across all of the non-linear elements and thus serves essentially as a time reference. Since the signal $2w_{LO}-w_s-\emptyset$ appears at the input terminals of the tunnel diode 40, it proceeds out the transmission line 30 to be reradiated. Again other frequencies are created incidentally, but they are not important to the invention.

The technique of this invention, with its beat of a first difference frequency once again across the non-linear element 40, is particularly advantageous when the locally generated frequency is frequency modulated to carry intelligence. This is true because the signal $w_{LO}$ is multiplied by two, and thus the frequency shift in the frequency modulation is doubled.

SIGNAL DIRECTIVITY FROM THE ARRAY

(1) Directivity—phase of incoming signal

Figure 7A:
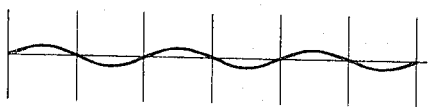
FIGS. 7a–7e illustrate the phase sequence of incoming electromagnetic radiations as they arrive at different antennas.
Figure 7B:
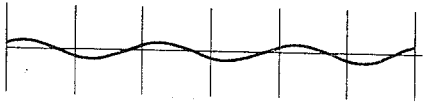
Figure 7C:
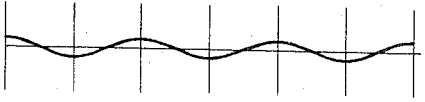
Figure 7D:
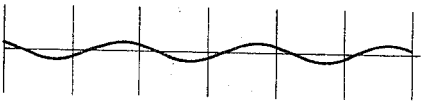
Figure 7E:

The redirective properties of the array provided by this invention will now be explained. Reference is made to FIG. 2, which shows an incoming signal 80 and an outgoing signal 82. The incoming signal 80 is the received interrogation signal. The points, indicated figuratively by circles labelled A, B, C, D, and E are at the same point in the cycle of the carrier, that is, they may all be at zero or at the peak of the cycle or at some other point. Clearly, however, each portion of the wave front arrives at a different array antenna element at a different time. Reference is made to FIGS. 7a–7e, where the phase sequence at several antennas is illustrated. For clarity in showing the point under consideration, five antennas equally displaced from the incoming signal are assumed. FIG. 7a shows the signal received at the antenna farthest from the origin of the incoming signal. At that point the signal is arbitrarily assumed to be passing through zero and originating a new cycle. FIG. 7b indicates the condition at the antenna next nearest the origin of the incoming signal at the same moments in time as FIG. 7a. The signal shown in FIG. 7a has passed by the antenna which FIG. 7b represents earlier in time. Thus, at the time assumed in the drawings, the signal at the antenna represented by 7b is somewhat past the zero point and thus leads FIG. 7a in phase. FIGS. 7c, 7d, and 7e represent the signals at antennas each progressively nearer the origin of the incoming signal at the same moments in time. Each leads the other in phase in the manner of the signals discussed in connection with FIGS. 7a and 7b.

The above phase sequence relationship occurs in the array of FIG. 2. A certain signal exists at the antenna 27E. The signal at 27I will lead it somewhat, at 27F the signal leads that at 27I, at 27H the signal leads still more, and the signal at 27G leads all the others.

(2) Directivity—phase of sidebands reradiated

Figure 8:
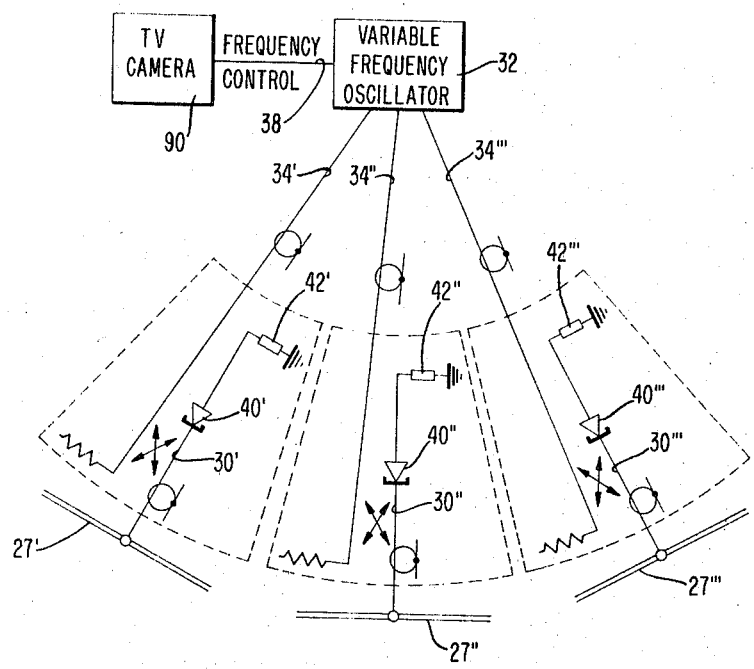
FIG. 8 is a partial schematic diagram of the spherical array system which illustrates how the antenna elements are connected with respect to each other.
Figure 9A:
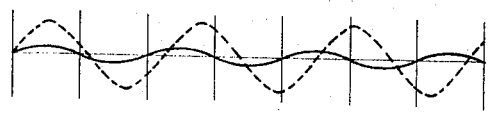
FIGS. 9a–9e illustrate the phase relationships of the two signals at each non-linear element.
Figure 9B:
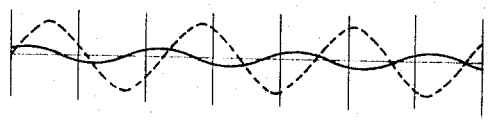
Figure 9C:
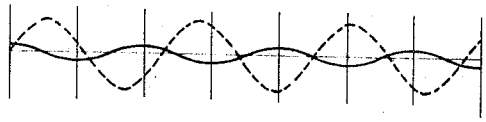
Figure 9D:
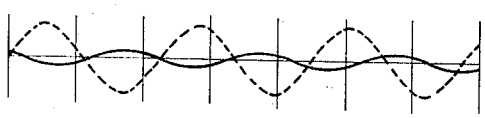
Figure 9E:
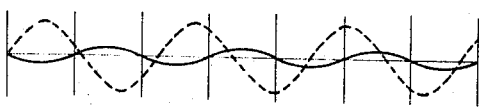

Change in directivity is obtained by a subtle use of phase relationships. Reference is made to FIG. 8, where the circular array is shown symbolically. FIG. 8 shows the variable frequency oscillator 32 and the frequency control 38 to the oscillator 32. A television camera 90 is situated in the satellite and creates an output which connects to the frequency control 38 to vary the frequency of the variable frequency oscillator 32. In this manner, the signals generated by the variable frequency oscillator 32 are frequency modulated in accordance with information observed by the television camera 90. FIG. 8 shows three antennas 27', 27'', and 27''', of the array, connected in accordance with the preceding discussion to coaxial transmission lines 30', 30'', and 30'''. Tunnel diodes 40, 40'', and 40''' are shown and also terminating resistors 42', 42'', and 42'''. The prime designations are used with the same numerals as those in the previous figures to indicate that the portion shown in FIG. 8 is arbitrarily selected and may or may not be those illustrated with the same numerals in preceding drawings. Of considerable importance in this preferred embodiment is that the transmission lines 34', 34'', and 34''' from the variable frequency oscillator 32 are of the same electrical length. This is also true of other transmission lines (not shown) which connect all of the plurality of antenna element systems (not shown) to the variable frequency oscillator 32.

The frequency modulation discussed previously in this specification is thus seen to be created by means such as the television camera 90 which controls variable frequency oscillator 32. The identical phase of locally generated signals across the non-linear element is thus seen to be provided in the specific embodiment by the equal length transmission lines 34', 34'', and 34''' and similar transmission lines (not shown). The entire arrangement creates lower sideband signals of a phase sequence such that redirectivity results in the direction of the received signal.

To fully illustrate the phase sequence of the lower sideband created, reference is made to FIGS. 9a through 9e. The relatively low amplitude signals, shown in solid lines, are the received signals. As discussed in connection with FIGS. 7a through 7b, the closer the receiving antenna is to the origin of the incoming signal, the more the received signal leads in phase. The larger signals, shown by dotted outline only for purposes of clarity in the drawings, are the signals from the variable frequency oscillator 32. FIGS. 9a through 9e illustrate that the signals from the variable frequency oscillator 32 appear with each received signal at the same phase while the received signals appear at different phases. The physical locations of the antennas assumed in FIGS. 9a through 9e are the same as the physical locations assumed for purposes of discussion in connection with FIGS. 7a through 7e. The two signals are beat in each antenna element system as described above in connection with FIG. 3. A lower sideband is produced in each antenna element system which has a phase which lags the locally generated signal as much as the received signal lead the locally generated signal. Since the phase of the locally generated signal is the same in each antenna element system, the lower sidebands produced have a phase sequence of increased phase lag at each antenna as the antennas are viewed in order from the antenna furthest from the origin of the transmitted interrogation signal to the antenna closest to the origin of the transmitted interrogation signal. Certain delays occur within each antenna element system, of course, but they are of equal time length in each system and the phase sequence described above is therefore preserved.

(3) Directivity—phase and location relationships

Since the receiving antenna of each antenna element is used as the reradiating antenna for the lower sideband produced, radiation of each lower sideband is at a location identical to that of the received interrogation signal which was beat to produce the sideband. The combined phase and space relationships discussed above satisfy the condition for redirectivity in a direction substantially back towards that of the incoming interrogation signal. This is further explained by the following:

In order to reradiate a collimated signal back in the direction of the incoming interrogation signal 80, shown in FIG. 2, each individual antenna element must radiate a signal which adds with the signals of the other antennas substantially along a line parallel to the front of the incoming wave 80. Further, a signal from an antenna when at a point in space displaced from the antenna is, in general, at a different phase from the signal being generated at a given instant actually at the antenna. Thus, it can be said, that two displaced antennas generate signals which add in a given direction when they are located and activated in such a manner that the signals generated have identical phases along an imaginary line normal to the direction of collimation.

This invention takes cognizance of the fact that the phase difference between the signals received at, for example, antenna 27G and antenna 27H is directly related to the time it took the incoming interrogation signal 80 to pass from antenna 27G to antenna 27H. This same relationship is true for a signal passing from antenna 27H to antenna 27F and to other further displaced antennas. This invention also takes cognizance of the fact that the reradiated signals travel out from each antenna at the same speed as the incoming interrogation signal travelled in. Thus, a signal radiated, for example, from antenna 27E will, at a certain distance from antenna 27E, lag the signal being reradiated at that instant in time by an amount directly proportional to the time required for an electromagnetic wave to travel from antenna 27E to the location at which the phase is examined. In this invention, the lag induced by the time of travel of the signal from antenna 27E, assuming that signal to be the same frequency as that of the incoming signal, is just enough to bring that signal in phase with the signal of antenna 27I along an imaginary line 100, shown in FIG. 2, parallel to the front of the incoming wave 80 and intersecting antenna 27I.

In order for the phase to be the same along the imaginary line 100, the signal at antenna 27E must lead the signal at antenna 27I by an amount directly related to the change in phase occurring when an electromagnetic wave travels in the direction of the incoming interrogation signal 80 between antenna 27E and antenna 27I. A signal of such leading phase is obtained by generating a lower sideband at each of the antennas 27E and 27I in the manner discussed fully in connection with FIG. 3. As above discussed, the lower sideband produced in each antenna element system lags in phase by an amount equal to the lead in phase of the incoming interrogation signal 80. Since the time for the incoming interrogation signal 80 to intercept antenna 27I and then reach antenna 27E is identical to the time for the reradiated sideband to leave antenna 27E and reach the imaginary line 100, the shift in phase sequence is seen to result in a reradiated signal which tends to add in a direction directly back toward the incoming interrogation signal 80. FIG. 2 illustrates these adding lower sideband signals by showing a wave 110 assumed to be generated by antenna 27E and the wave 112 generated by antenna 27I at the same time. These drawings show clearly that the two waves are at the same frequency when they intercept normally the imaginary line 100.

The same analysis can be extended to the interaction between antenna 27F and antenna 27I. The two signals are at the same phase when they normally intercept an imaginary line 102. The signal 114 from antenna 27F is shown to add with the signals 110 and 112. It is thus shown that the three signals from antennas 27E, 27I, and 27F tend to add in a direction back toward that of the incoming interrogation signal 80. Once again, the analysis holds for antenna 27H and antenna 27F and for antenna 27G and for antenna 27H. The imaginary lines 104 and 106 show the addition of the signals. The signal 116 is generated by antenna 27H, and the signal 118 is generated by antenna 27G. The total result is a plurality of antennas, all radiating signals which tend to constitute themselves into a wave front directed back in the direction opposite from that of incoming interrogation signal 80. As is well known in the directional antenna art, when a plurality of antennas tend to add in one direction, it follows that they tend to subtract in other directions and that a collimated directive signal is obtained.

By induction it should now be clear that a general relationship has been established and that the antennas shown symmetrically located in the preferred embodiment could, in fact, be in any space configuration. The basic requirement that the phase sequence of the incoming interrogation signal be reversed in the reradiated signal is satisfied regardless of the configuration of the antennas. It should also be noted that the relationships discussed above are equally true for the three dimensional antenna of FIG. 2. The reradiated sidebands add on the planes passing through the lines 100, 102, 104, and 106, normal to the incoming interrogation signal 80.

(4) *Directivity—Advantages of spherical array*

The preferred embodiment utilizes a spherical array to cancel slight inaccuracies inserted because the lower sideband signals reradiated are not identical in frequency to the incoming interrogation signals. The above analysis assumed such identical frequency and traced the reradiated signals to find theoretically perfect addition in a direction directly back toward the incoming interrogation signal. If a reradiated signal of somewhat different wave length than the incoming interrogation signal is assumed, differences in phase are not perfectly cancelled by the reradiated signal travelling the same distance between antennas as the incoming signal travelled. Assuming, as is the case in the preferred embodiment, that the lower sideband is at a somewhat lower frequency and thus has a somewhat longer wave length, a signal previously generated by the antenna 27E and now found on an imaginary line 100 parallel to the line of the incoming interrogation signal 80 and passing through antenna 27I, will, due to its longer time within a single cycle, actually have a phase slightly leading that presently generated at antenna 27I. The phase will be equal to that at antenna 27I at a point slightly past the imaginary line 100 away from the satellite. It is clear that the difference will not be extreme because, as fully analyzed above, as the lower sideband approaches the frequency of the incoming interrogation signal, the inaccuracy now under discussion diminishes to theoretically perfect results.

The value of the curved array becomes apparent when the antennas 27I and 27F are examined in view of the previous examination of the antennas 27E and 27I. By the same analysis of antennas 27E and 27I, it will be clear that the proper phase of the signal generated by antenna 27I, instead of falling upon the line 102, will fall at a point slightly past that imaginary line and away from the satellite. A general characteristic of the convex curved array now begins to become apparent. The reconstructed wave of the lower sideband signal is not theoretically perfect, but the antennas on each side of center of the incoming interrogation signal 80 generate signals which have inaccuracies which tend to cancel. The reconstituted wave 82, shown in FIG. 2, is illustrated in a slightly concave configuration to show exactly the form of the reconstituted wave 82. Since the inaccuracies on each side of the center of the reradiated wave are in opposite directions, they tend to cancel. Some power may be lost, but the reconstituted wave 82 has a direction directly back toward the incoming interrogation signal 80.

A second advantage of the spherical array is in the fact that it discriminates between the lower sideband signal reradiated and the incoming interrogation signal 80. The incoming interrogation signal 80 is not changed in phase by the converter circuit discussed above. It therefore appears at the antenna elements with a phase sequence opposite to that of the lower sideband. The above detailed consideration of phase and location could be applied to this signal. It should be clear, however, without going into such detail, that the signal of opposite phase will be scattered rather than collimated. The relationships and results are analogous to the shining of a beam of radiation on a spherical mirror. The reconstituted wave 82 thus arrives at the ground unaccompanied by a substantial signal of the frequency of the transmitted interrogation signal 80. Since the two are of nearly the same frequency, a possible source of interference is greatly reduced.

FEATURES AND ADVANTAGES OF THE ARRAY SUMMARIZED

It will be noted that the redirective array described does not use non-reciprocal devices, except simple directional couplers. In addition, neither the incoming nor the outgoing signal is filtered. Any circuit element introduces distortion to some extent, and the elimination of circuit elements is therefore quite desirable. The signal converter circuit can be a structurally uncomplicated one, as shown, without elaborate elements which would introduce distortion. The antenna array is lightweight. Its minimum of structure reduces the possibility of malfunctions. Furthermore, the malfunction of one or a few array elements would not disable the array.

Good gain and directivity is obtained. The band width of a frequency modulated signal is doubled, with no increase or further complications in structure. The antenna system is a highly flexible one. Particularly, it should be noted that the television camera 90 is shown merely as a preferred embodiment of the system and that it could be replaced by a receiver so that one ground station could communicate with the receiver in the satellite and a second ground station could interrogate the satellite to receive those communications.

THE COMMUNICATIONS SYSTEM

Figure 10:
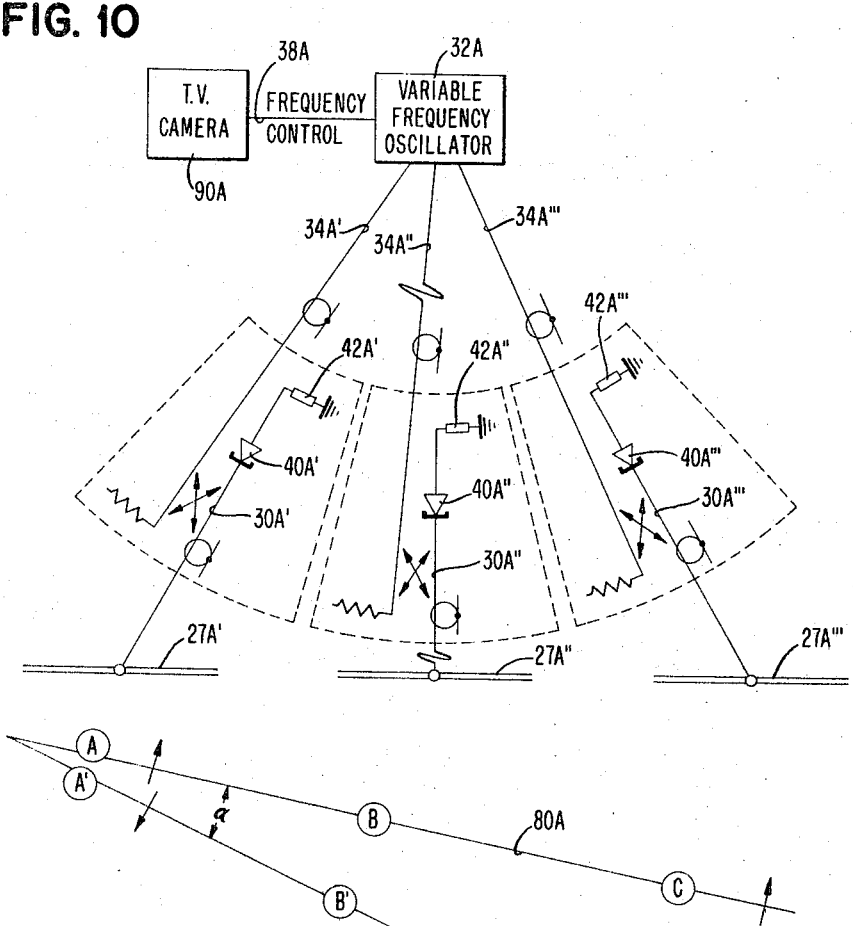
FIG. 10 is a schematic drawing which makes clear the actual structure and electrical operation of the linear array.

Conversely, an alternative preferred device which obtains selective redirectivity by utilizing the wave length differences of the reradiated signal described above is also included as a preferred device used in this invention. This alternative preferred device is a flat, or linear, antenna array. Reference is now made to FIG. 10 where an array system is shown in which selective directivity by use of a linear array is obtained. FIG. 10 is similar in most respects to FIG. 8, and for that reason the notations of FIG. 8 are used with the addition of an alphabetical suffix. In FIG. 10, however, the antennas 27A′, 27A″, and 27A‴ are located on a plane and thus present a flat face to an incoming wave. Sideband signals issue from the antennas 27A′, 27A″, 27A‴, and other antennas (not shown) in the same manner as sideband signals were produced as described in connection with FIG. 8.

The linear configuration of the antenna array of FIG. 10, however, preserves shifts in directivity which result from the different wave lengths of sidebands produced with respect to the frequency of the incoming interrogation signal. For each frequency of lower sideband reradiated, the recollimated redirectional signal 130, shown in FIG. 10, has an angular displacement different with reference to the incoming interrogation signal 80A. FIG. 10 shows a reradiated signal which is of lower frequency. The phase of such lower frequency signals, because of their longer wave length, add coherent along an imaginary line which is further from the imaginary line of the incoming interrogation signal 80 in direct proportion to the difference in time between when the incoming interrogation signal intercepts the different antennas. A coherent wave front 130 results which is tilted by the angle α with reference to the incoming interrogation signal 80A. As the sideband wave length is increased, either by reducing the median frequency of variable frequency oscillator 32A or by increasing the frequency of received signal 80A, the angle α increases.

Figure 11:
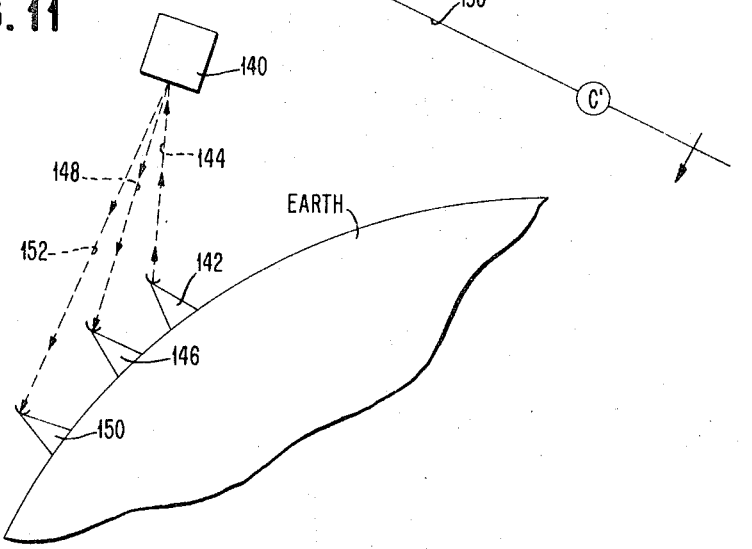
FIG. 11 is a system diagram showing how the linear array makes possible selective communications with a plurality of differently located receivers.

FIG. 11 shows a preferred embodiment of a system using a linear array. A satellite 140 carrying a linear array is situated above the ground. An interrogating station 142 transmits interrogation carrier signal 144 to the satellite 140. A first receiving station 146 receives a redirected signal 148. A second receiving station 150 receives a redirected signal 152. The transmitting ground station 142 brings signal 148 to receiver 146 by transmitting a signal 144 of a first frequency. By merely decreasing the frequency of signal 144, a different signal 152 appears which is directed to receiver 150.

The selective features of the linear array make use of the unsymmetrical face of the array. The angle of shift, as should be clear from the above, can be computed by finding the distance away from an imaginary line parallel to the incoming interrogation signal and passing through a preceding antenna at which the phase of the signals are in synchronism. As the attitude of the array presents a greater angle to the interrogation signal, the reradiated signals travel a greater distance in returning to the imaginary line passing through a preceding antenna. Counterclockwise directivity shifts, as shown in FIG. 10, inserted by longer wave lengths are exaggerated as the array is shifted counterclockwise from the horizontal attitude with reference to the incoming interrogation signal 80A shown in FIG. 10. The requirement that the linear array used for selective directivity have a relatively stable attitude in space can be compensated for by proper frequency selection on the ground and doubtless by other techniques depending upon the system. Furthermore, the linear array has all of the other features and advantages of the convex array.

While the invention has been particularly shown and described with reference to preferred embodiments thereof, it will be understood by those skilled in the art that the foregoing and other changes in form and details may be made therein without departing from the spirit and scope of the invention. In particular, it should be noted that the redirective array of this invention is useful in most satellite communication applications. The invention would be equally beneficial if the television camera carried in the satellite in the preferred embodiment were removed and the satellite were adapted for communication between one ground station transmitting intelligence and a second ground station interrogating the satellite in the manner fully described and explained above.

I claim:
1. An antenna system comprising:
    a plurality of individual signal converters each responsive to at least two signals at the input of each said signal converter to produce a third signal at each said input with phase which is a function of the difference of the phase of said two signals,
    a plurality of individual antenna elements each adapted to receive transmitted electromagnetic radiation, at least two of said individual antenna elements each being electrically connected to the input of a signal converter,
    means to generate an oscillatory signal,
    means to connect said oscillatory signal across the input of each said signal converter connected to an antenna element in substantially the same phase relationship at each said signal converter and,
    means connected to the input of each signal converter to reradiate said third signal in a pattern in which all reradiated third signals add coherently.
2. The system as in claim 1 also comprising means to vary said oscillatory signals in response to signals carrying intelligence.

3. The system as in claim 1 comprising at least three operative antenna elements located in a convex configuration.

4. The system as in claim 1 comprising at least three operative antenna elements located in a linear configuration.

5. A communications system comprising the antenna system as in claim 4, a transmitter to transmit said transmitted electromagnetic radiation, and a receiver of said third signal displaced from said transimtter of said transmitted electromagnetic radiation.

6. An antenna system comprising:
  a plurality of individual signal converters each comprising a non-linear element to produce a sideband of at least two signals connected to the input of each said signal converter,
  a plurality of individual antenna elements each adapted to receive transmitted electromagnetic radiation, at least two of said individual antenna elements each being electrically connected to the input of a signal converter,
  means to generate an oscillatory signal,
  means to connect said oscillatory signal across the input of each said signal converter connected to an antenna element in substantially the same phase at each said signal converter,
  and means connected to the input of each signal converter to reradiate said sideband in a pattern in which all of a reradiated sideband signals add coherently.

7. The system as in claim 6 wherein each said means to reradiate a sideband connected to one non-linear element is constructed and arranged to maintain the phase of each said sideband signal relative to the phase of said other sideband signals created by other said non-linear elements and wherein all said means to reradiate a sideband are positioned at locations physically displaced from one another in a pattern substantially the same in location and relative position as the transmitted electromagnetic radiations which will produce each sideband will be received.

8. The system as in claim 7 also comprising means to vary said oscillatory signals in response to signals carrying intelligence.

9. An antenna system comprising:
  a plurality of individual signal converters each comprising a non-linear element to produce a sideband of at least two signals connected to the input of each said signal converter,
  a plurality of individual antenna elements each adapted to receive transmitted electromagnetic radiation,
  means to electrically connect at least two of said individual antenna elements each to the input of a signal converter,
  means to generate an oscillatory signal,
  means to connect said oscillatory siginal across the input of each said signal converter connected to an antenna element in substantially the same phase at each said signal converter, and
  means comprising each said individual antenna element and its connection at each said signal converter to reradiate said sideband at each said individual antenna element.

10. The system as in claim 9 wherein said signal converters also comprise means to block from the input of each said signal converters signals of low frequency relative to said sideband to be reradiated and also comprising means to reflect said low frequency signals in a voltage mode back across each said non-linear element.

11. The system as in claim 10 wherein said non-linear element is an active element.

12. The system as in claim 11 wherein said active element is a tunnel diode.

13. The system as in claim 12 wherein said means to block low frequency signals from the input and said means to reflect low frequency signals comprises a capacitance and a resistance in electrical parallel with said capacitance of magnitude sufficient to cause substantial amplification and reradiation of a beat signal of said low frequency signal and said locally generated signal.

14. The system in claim 13 also comprising means to vary said oscillatory signals in response to signals carrying intelligence.

15. The system as in claim 13 comprising at least three operative antenna elements located in a convex configuration.

16. The system as in claim 13 comprising at least three operative antenna elements located in a linear configuration.

17. A communications system comprising the antenna system as in claim 16, a transmitter to transmit said transmitted electromagnetic radiation, and a receiver of said sideband displaced from said transmitter of said transmitted electromagnetic radiation.

18. An antenna system comprising:
  a plurality of individual signal converters each comprising:
    a tunnel diode biased at a point at which a varying potential across said tunnel diode will operate a substantial portion within the negative region of the characteristic curve of said tunnel diode and a substantial portion within the positive region of the characteristic curve of said tunnel diode,
    a capacitor located electrically near said tunnel diode to block from the input of said signal converter signals of one frequency, and
    a resistor electrically in parallel to said capacitor located electrically near said tunnel diode to operate with said capacitor to reflect at least a portion of said signals of said one frequency,
  a plurality of individual antenna elements each adapted to receive transmitted electromagnetic radiation,
  means to electrically connect at least two of said individual antenna elements each to the input of a signal converter,
  means to generate an oscillatory signal,
  means to vary said oscillatory signal in response to signals carrying intelligence,
  means to connect said oscillatory signal across the input of each said signal converter connected to an antenna element in substantially the same phase at each said signal converter, and
  means comprising each said individual antenna element and its connection at each said signal converter to reradiate said sideband at each said individual antenna element.

19. The system as in claim 18 comprising at least three operative antenna elements located in a substantially spherical configuration.

20. The system as is claim 18 comprising at least three operative antenna elements located in a linear configuration.

21. A communications system comprising the antenna system as in claim 20, a transmitter to transmit said transmitted electromagnetic radiation, and a receiver of said sideband displaced from said transmitter of said transmitted electromagnetic radiation.

22. An antenna arry system for redirecting a received signal comprising:
  means at said array to generate an oscillatory signal of power substantially greater than said received signal,
  a plurality of electrical transmission means,
  a plurality of antenna elements adapted to receive transmitted electromagnetic waves, at least two of said antennas each being connected to one of said electrical transmission means,
  a plurality of tunnel diodes each located near the electrical end of each said electrical transmission means connected to an antenna, means to bias said tunnel diodes for operation near the negative characteristic portions of the characteristic curves of said tunnel diodes, means to directionally couple said oscillatory signal to each said electrical transmission means connected to an antenna, each said means to directionally couple said oscillatory signal being the same electrical length, and, means to impress signals of low frequency relative to said receive signal frequency created by said tunnel diodes back across said tunnel diode whereby a beat signal of inverted phase is generated and reradiated directionally by said antenna elements.

23. The system as in claim 22 also comprising means to vary said oscillatory signals in response to signals carrying intelligence.

24. The system as in claim 22 comprising at least three operative antenna elements located in a substantially spherical configuration.

25. The system as in claim 22 comprising at least three operative antenna elements located in a linear configuration.

26. A communications system comprising the antenna array system as in claim 25, a transmitter to transmit said transmitter electromagnetic radiation, and a receiver of said beat signal displaced from said transmitter of said transmitted electromagnetic radiation.

References Cited by the Examiner
UNITED STATES PATENTS 3,150,320  9/1964  Gruenberg.
3,151,326  9/1964  Ohm.

OTHER REFERENCES

D.E.N. Davies, I.E.E.E Proceedings, vol. 110, No. 3, March 1963, pp. 507–512.

RODNEY D. BENNETT, *Primary Examiner.*

CHESTER L. JUSTUS, *Examiner.*

R. E. BERGER, *Assistant Examiner.*